Oct. 21, 1969  HARUKI OKAMOTO  3,474,444

COLLISION PREVENTING SYSTEM

Filed Feb. 29, 1968

United States Patent Office 3,474,444
Patented Oct. 21, 1969

3,474,444
COLLISION PREVENTING SYSTEM
Haruki Okamoto, Kyoto, Japan, assignor to Mitsubishi Denki Kabushiki Kaisha, Tokyo, Japan
Filed Feb. 29, 1968, Ser. No. 709,302
Claims priority, application Japan, Mar. 13, 1967, 42/15,747
Int. Cl. G01s 9/02
U.S. Cl. 343—7                6 Claims

ABSTRACT OF THE DISCLOSURE

The disclosed system uses a radar set including a transmitter for transmitting pulses at irregular intervals of time and a receiver capable of being brought in operation substantially in synchronization with the building up of each of the transmitted pulses and for a period of time nearly equal to the duration of the pulse. An output from a continuous noise generator is first fed through a band-pass filter and then sliced and differentiated to form two sets of pulses having a common, irregular recurrence rate and the respective front edges raised substantially simultaneously. These sets of pulses are applied to the transmitter and the receiver to control them respectively.

---

This invention relates to a system for preventing collisions of traveling bodies such as automobiles through the use of a special radar set.

In order to prevent collisions of traveling vehicles such as automobiles, it has been heretofore practiced to transmit a laser energy, an ultrasonic energy or an electrical energy ahead from each of the vehicles and to sense the corresponding energy reflected from an obstacle positioned in front of that vehicle, by the latter whereupon it either signals an alarm or brakes. However, since such vehicles all have used a common frequency of energy the particular vehicle traveling in one direction could receive, in addition to an echo or echoes for the energy transmitted by the same, echoes for energies transmitted by other vehicles traveling in one direction and energies directly transmitted by vehicles traveling in other directions resulting in the possibility of erroneously operating a receiver equipped on that vehicle.

Accordingly it is a general object of the invention to eliminate the above-mentioned disadvantage of the prior art practice.

It is an object of the invention to provide a new and improved system for preventing collisions of traveling bodies such as automobiles through the use of a radar set which system is simple in construction and reliable in operation.

Briefly, the invention accomplishes the above cited objects by the provision of a system of preventing collisions of traveling bodies, comprising a radar set disposed on each of the vehicles, the radar set including transmitter means for transmitting transmission pulses at irregular intervals of time, receiver means capable of being put in operation substantially simultaneously with the occurrence of the built up portion of each of the transmission pulses, and means for rendering the duration of the transmission pulse substantially equal to a period of time for which the receiver is put into operation.

The invention will become more readily apparent from the following detailed description taken in conjunction with the accompanying drawing in which.

Figure 1:
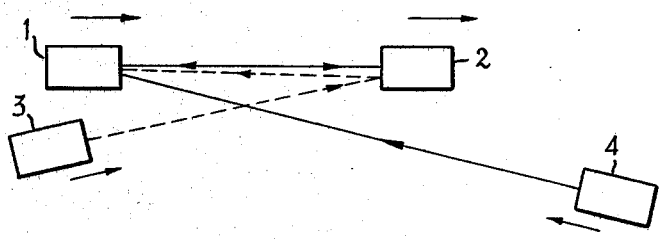
FIGURE 1 is a diagrammatic view useful in explaining the conventional collision preventing system.

Referring now to the drawing and FIGURE 1, in particular, it is seen that two traveling bodies such as automobiles 1 and 2 are traveling in one direction, in this case, the righthand direction as viewed in FIGURE 1 while the automobile 2 is positioned in front of the automobile 1. A third automobile 3 positioned on one side of the automobile 1 is also traveling in the substantially same direction as does the automobile 1 and a fourth automobile 4 is traveling in a direction opposite to the general direction in which the other automobiles are traveling. In FIGURE 1 the arrows denoted adjacent the automobiles indicate the directions in which the associated automobiles are traveling.

Each of the automobiles has equipped thereon a radar set (not shown) for transmitting radar pulses and receiving their echoes. For example, a radar set equipped on the automobile 1 transmits radar pulses in front thereof which, in turn reach the automobile 2 and reflect from the latter as shown at solid line in FIGURE 1. Then that radar set receives those reflected pulses. Since the radar sets equipped on all the automobiles transmit the respective radar pulses having a common frequency, a radar receiver unit disposed on the automobile 1 for example can also respond to radar pulses transmitted by the automobile 3 and reflected from the automobile 2 and to radar pulses directly transmitted by the automobile 4. Therefore the radar receiver unit on the automobile 1 may be erroneously operated.

The invention contemplates to prevent a radar receiver unit on each traveling body from being erroneously operated.

Figure 2:
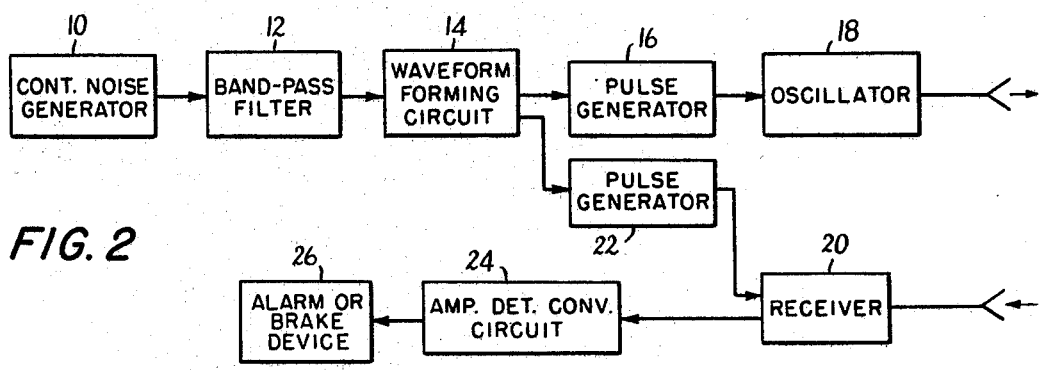
FIGURE 2 is a block diagram of a collision preventing system constructed in accordance with the principles of the invention.

Referring now to FIGURE 2, there is illustrated a collision preventing system constructed in accordance with the principles of the invention. An arrangement illustrated is equipped on each of traveling bodies such as automobiles and comprises a TRANSMITTER UNIT and a RECEIVER UNIT. The TRANSMITTER UNIT includes a noise generator 10 for continuously generating a noise signal, and a band-pass filter 12 having a relatively narrow width of pass band and connected to the output of the noise generator 10. That portion of the noise signal passed through the band-pass filter 12 is applied to a waveform amplifying and forming circuit 14 where after amplification it is formed into pulses in the manner as will be described hereinafter. These pulses are supplied to a pulse generator 16 where they are converted to rectangular pulses having a predetermined amplitude and a predetermined duration. The TRANSMITTER UNIT further includes an oscillator 18 controlled by the pulse generator 16 to produce a transmission energy. The oscillator 18 may be a laser oscillator, a ultrasonic oscillator or the like as the case may be. The transmission energy is adapted to be transmitted in front of the particular automobile on which the illustrated arrangement is equipped while the energy has a predetermined directivity.

The RECEIVER UNIT includes a receiver 20 adapted to receive a transmission energy transmitted by the associated transmitter 18 and reflected from an obstacle, if present, which may be a traveling body such as automobile positioned in front of that automobile having equipped thereon the receiver 20. As shown in FIGURE 2, the receiver 20 is controlled by a pulse generator 22 which is, in turn controlled by the waveform amplifying and forming circuit 14 as above described. The pulse generator 22 is substantially similar to the pulse generator 16. The output from the receiver 20 is applied to a combined amplifier, detector and converter circuit 24 where it is amplified, detected and then converted to a direct current signal. An indication device 26 is connected to the circuit 24 and adapted to respond to the output from the latter exceeding a predetermined level to indicate the presence of an obstacle such as an automobile in front of the associated traveling body. The indication device 26 may be an alarm device for signalling an alarm or a brake device for braking the associated traveling body.

The operation of the arrangement illustrated will now be described in conjunction with FIGURES 3a, b and c. As previously described, the oscillator 18 is controlled by the pulse generator 16 to produce transmission pulses only when the same has the rectangular pulses applied thereto from the pulse generator 16. It is now assumed that the rectangular pulse from the generator 16 has a pulse width or a duration of $\tau_1$ and a mean recurrence rate of T. It is to be noted that the duration and the mean recurrence rate should be selected in accordance with various factors such as the type of transmission energy or whether it is of the laser type or the ultrasonic type, a detectable range within which the presence of any obstacle can be detected by the associated receiver 20.

It is also assumed that the band-pass filter 12 has the center frequency $f$ equal to $1/T$ and a pass band width suitably selected. Under the assumed conditions a voltage appearing at the output of the band-pass filter 12 will have a signal having a predominant frequency of $1/T$ and an amplitude irregularly varied with respect to time such as designated by the reference numeral 28 in FIGURE 3a.

Figure 3A:
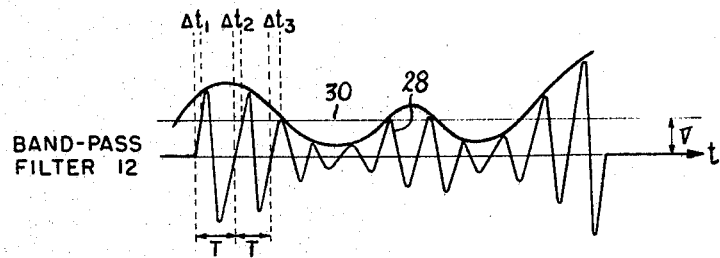
FIGURES 3a, b and c are waveforms developed at various points on the system illustrated in FIGURE 2.

The voltage signal 28 is applied to the waveform amplifying and forming circuit 14 where it is suitably amplified and sliced at two predetermined magnitudes such as 0 and V volts as designated by the time axis and a horizontal line 30 in FIGURE 3a. The sliced waveform is differentiated to form pulses. The pulses thus formed are then applied to both pulse generators 16 and 22 to control them.

Figure 3B:
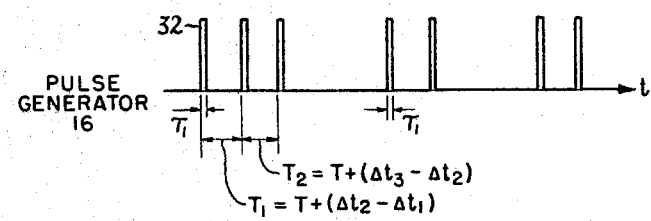

The pulse generator 16 responds to the pulses from the circuit 14 to provide a train of rectangular pulses having a predetermined duration of $\tau_1$, a recurrence rate irregularly varied with time and a fixed common amplitude as shown at 32 in FIGURE 3b. The rectangular pulses 32 have different recurrence rates such as $$T_1 = T + (\Delta t_2 - \Delta t_1)$$

$T_2 = T + (\Delta t_3 - \Delta t_2)$ . . . where T has the same meaning as previously described, and $\Delta t_1$, $\Delta t_2$, $\Delta t_3$ . . . represent periods of time for which the corresponding voltage wave from the band-pass filter 12 are raised from a lower one of the predetermined magnitude in this case zero volt up to the other predetermined magnitude of V volts. It has been found that, with the band-pass filter 12 designed to have an appreciably narrow pass band width, the magnitudes of $(\Delta t_2 - \Delta t_1)$ $(\Delta t_3 - \Delta t_2)$ . . . can be substantially small as compared with the mean recurrence rate T and irregularly different from one another.

The train of pulses 32 is applied to the oscillator 18 to permit the latter to produce transmission pulses in synchronization with the occurrence of the pulses 32. The transmission pulses are given a predetermined directivity and emitted in front of the associated traveling body. Thus it will be appreciated that the TRANSMITTER UNIT emits the transmission pulses at irregular intervals of time determined by the pulses 32 formed by the pulse generator 16 and only for their duration.

If an obstacle for example an automobile is positioned in front of the particular automobile from which the transmission pulses have been emitted and within the detectable range thereof then the pulses are reflected by the obstacle until they are received by the associated receiver 20.

Figure 3C:
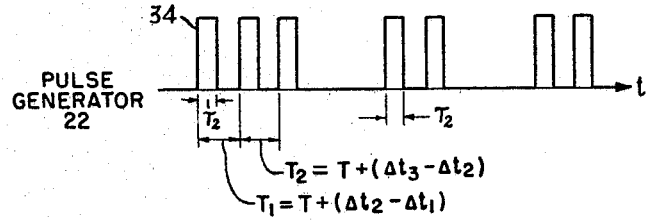

As previously described, the receiver 20 is controlled by the pulse generator 22 which is, in turn, controlled by the waveform amplifying and forming circuit 14. The pulse generator 22 responds to the pulses delivered from the circuit 14 to provide a train of rectangular pulses substantially similar to the train of rectangular pulses 32 except for their duration $\tau_2$ somewhat longer than the duration $\tau_1$ of the pulses 32. These pulses are shown at 34 in FIGURE 3c as being built up substantially at the same time as do the corresponding pulses 32. The pulses 34 are applied to the receiver 20 to cause it to be brought into operation only for the duration of each pulse. In order to permit the receiver 20 to receive an echo originating from the associated transmitter 18, the duration $\tau_2$ of the pulse 34, is preselected to be longer than the duration $\tau_1$ of the pulse 32 by taking into account of a time delay required to cause the echo to reach the receiver 20. However it is to be noted that the duration $\tau_2$ should not exceed a period of time required for the transmission pulses from the transmitter 18 to reciprocate the detectable range of the system. This is because in the case the duration $\tau_2$ becomes too long, there may be an increase in probability that the particular receiver is caused to interfere with a transmitter equipped on any of other traveling bodies.

If desired, the built up portion of each pulse 34 may lay slightly behind that of the corresponding pulse 32 in order to prevent the transmission pulses from the transmitter 18 from directly reaching the associated receiver 20.

If the receiver 20 receives an echo originating from the associated transmitter 18, the same supplies an output at a sufficient level to the combined amplifier, detector and slicer circuit 24 which, in turn, provides a direct current signal. This signal is applied to the alarm or brake device 26 to actuate the latter.

In summary, the invention comprises the transmitter for emitting transmission pulses at irregular intervals of time while they have a predetermined means recurrence frequency $f=1/T$ and the associated receiver capable of being operated at intervals of time substantially identical to the irregular intervals of time for the transmission pulses and for a predetermined period of time. This ensures that the TRANSMITTER UNIT perfectly correlates with the associated RECEIVER UNIT and that the receiver receives effectively all echoes resulting from the associated transmitter. However although the particular receiver might receive any interfering pulse and/or echo in overlapping relationship with respect to an echo originating from the associated transmitter, a probability that such overlap may occur is low and the receiver provides only an output whose magnitude is too low to operate the alarm or brake device 26. Therefore the system disclosed herein is possible to separate an echo originating from the transmitter involved from transmission pulses and echoes originating from other traveling bodies.

While the invention has been illustrated and described in conjunction with a few preferred embodiments thereof it is to be understood that various changes and modifications may be resorted to.

What I claim is:

1. A system for preventing collisions of a first traveling body with a second body, said system comprising, all on said first body, a noise generator for generating a noise signal, wave shaping circuit means receiving said noise signal and shaping it to provide irregularly spaced pulse signals, a first pulse generator receiving said pulse signals and producing pulses of uniform amplitude and duration at irregularly spaced intervals, a signal transmitter connected to and controlled by said first pulse generator to transmit energy signals for reflection by said second body, said energy signals having an irregular interval spacing and a duration corresponding to said pulses produced by said first pulse generator, a second pulse generator receiving said pulse signals from said shaping circuit means and producing pulses of uniform amplitude and duration at the same intervals as those produced by said first pulse generator, a receiver for receiving said energy signals transmitted by said transmitter and reflected by said second body, said receiver being connected to and controlled by said second pulse generator to respond to said reflected signals only at intervals and for a duration corresponding to the pulses produced by said second pulse generator so as to respond only to signals transmitted by said transmitter on said first body and reflected by said second body.

2. A collision preventing system according to claim 1, wherein said second pulse generator produces pulses having a duration which is longer than that of pulses produced by said first pulse generator but does not extend beyond the period of time required for travel of said energy signals to and from said second body at a selected distance from said first body.

3. A collision preventing system according to claim 1, wherein said second pulse generator produces pulses the rise of which occurs slightly after the rise of corresponding pulses produced by said first pulse generator.

4. A system for preventing collisions of a first traveling body with a second body, said system comprising, all on said first body, a noise generator for continuously generating a noise signal, a band-pass filter for extracting from the output from said noise generator a predominant signal having an irregular amplitude and an irregular wave shape, a waveform forming circuit for cutting the output from said band-pass filter at two selected levels and forming pulses, a first pulse generator circuit responsive to said pulse output from said waveform forming circuit to provide at the output pulses having a predetermined duration, a signal transmitter for transmitting energy signals having said predetermined duration, a second pulse generator circuit connected to said waveform forming circuit to provide at the output pulses rising substantially at the same time as the pulses provided by said first pulse generator circuit and having a predetermined duration substantially equal to that of said pulses provided by said first pulse generator circuit, a receiver controlled by said second pulse generator circuit to perform a receiving operation only for a period of time when said second pulse generator circuit is generating each of the pulses, and indicating means responsive to a predetermined output from said receiver to indicate the presence of a said second body in front of said first body within a selected distance.

5. A system as claimed in claim 4, wherein said indicating means are alarm means responsive to said predetermined output from said receiver to signal an alarm.

6. A system as claimed in claim 4, wherein said means are braking indicating means responsive to said predetermined output from said receiver to brake the associated traveling body.

References Cited

UNITED STATES PATENTS 3,176,294  3/1965  Merlo et al.
3,293,600  12/1966  Gifft _____ 180—98 X
3,337,866  7/1967  Gisonno.

RODNEY D. BENNETT, JR., Primary Examiner

T. H. TUBBESING, Assistant Examiner

U.S. Cl. X.R.

180—98; 340—1, 34